(12) United States Patent
Takata

(10) Patent No.: US 7,433,074 B2
(45) Date of Patent: Oct. 7, 2008

(54) IMAGE FORMING APPARATUS AND IMAGE FORMING METHOD

(75) Inventor: Shin-ichi Takata, Chiba (JP)

(73) Assignee: Canon Kabushiki Kaisha (JP)

( * ) Notice: Subject to any disclaimer, the term of this patent is extended or adjusted under 35 U.S.C. 154(b) by 996 days.

(21) Appl. No.: 10/815,306

(22) Filed: Apr. 1, 2004

(65) Prior Publication Data
US 2004/0212888 A1   Oct. 28, 2004

(30) Foreign Application Priority Data
Apr. 2, 2003   (JP)   ............................. 2003-099498

(51) Int. Cl.
*H04N 1/40*   (2006.01)

(52) U.S. Cl. ....................... 358/1.7; 358/296

(58) Field of Classification Search .................. 358/1.7, 358/1.9, 2.1, 505, 296–300; 399/4; 347/224, 347/229, 237, 247–250
See application file for complete search history.

(56) References Cited

U.S. PATENT DOCUMENTS 5,796,511 A * 8/1998 Allen et al. ................. 359/305
5,905,851 A * 5/1999 Morimoto et al. ............ 358/1.4
5,923,461 A * 7/1999 Allen et al. ................. 359/305

FOREIGN PATENT DOCUMENTS

| JP | 2-282763 A | 11/1990 |
|----|-----------|---------|
| JP | 08-01.1347 A | 1/1996 |
| JP | 08-258329 A | 10/1996 |
| JP | 9-218370 A | 8/1997 |
| JP | 11-198435 A | 7/1999 |

* cited by examiner

*Primary Examiner*—Thomas D Lee
*Assistant Examiner*—Stephen M Brinich
(74) *Attorney, Agent, or Firm*—Rossi, Kimms & McDowell LLP

(57) ABSTRACT

An image forming apparatus that is capable of scanning at a proper speed at all positions on a main scan line without being affected by variations in the characteristics of a f-θ lens, variations in the laser beam wavelength, irregularities in the rotational speed of a polygon mirror and fluctuations in the characteristics of the f-θ lens due to changes in ambient temperature. An image clock signal for exposure control is generated for each of a plurality of segments obtained by dividing a main scan line on a photosensitive drum scanned by a laser beam, based on a modulation coefficient. The modulation coefficient is corrected based on the detected phase difference between detection timing of the terminating end of the main scan line and generation timing of the last image clock signal for the last segment.

20 Claims, 4 Drawing Sheets

IMAGE FORMING APPARATUS AND IMAGE FORMING METHOD

BACKGROUND OF THE INVENTION

1. Field of the Invention

The present invention relates to an image forming apparatus and an image forming method that control an image clock frequency (hereinafter referred to as the "laser driving frequency") used in ON/OFF control of a laser beam that scans an image carrier such as a photosensitive member.

2. Description of the Related Art

In an electrophotographic image forming apparatus, generally, latent image formation on a photosensitive member is carried out by scanning a laser beam emitted from a semiconductor laser by turning the laser beam on and off using a polygon mirror such as a photosensitive drum so that the laser beam is irradiated onto the photosensitive member, developing the latent image into a toner image, and transferring the toner image onto a recording medium.

A conventional optical scanner unit is shown in FIG. 4.

In the conventional optical scanner unit, a laser beam is emitted from a laser beam source 101 based on an image clock signal determined by the resolution of an image to be formed, and the emitted laser beam is deflected by a polygon mirror 102 rotating at a constant angular velocity and irradiated onto a photosensitive member 105 via a f-θ lens 103 and a reflecting mirror 104.

At this time, due to the action of the polygon mirror 102 rotating at a constant angular velocity and the f-θ lens 103, the laser beam is irradiated onto the photosensitive member 105 while being moved in a direction indicated by the arrow (in the main scanning direction) at a constant velocity. The polygon mirror 102 is disposed at a location opposite a central portion of the photosensitive member 105, and therefore, if there were no f-θ lens 103, the length of the optical path of the laser beam would be greater at end portions of the photosensitive member 105 than at the central portion thereof, with the result that the main scanning speed would be faster at the end portions of the photosensitive member 105 than at the central portion thereof.

Thus, the f-θ lens 103 acts to correct differences in the main scanning speed with respect to the photosensitive member 105 due to the differences in the length of the optical path to the photosensitive member 105 of the laser beam deflected by the polygon mirror 102, so as to make the main scanning speed constant between the end portions of the photosensitive member 105 and the central portion thereof.

However, it is difficult to maintain the laser beam main scanning speed constant with respect to the photosensitive member 105, due to such factors as variations in the characteristics of the f-θ lens 103, variations in the laser beam wavelength, irregularities in the rotational speed of the polygon mirror 102, and fluctuations in the characteristics of the f-θ lens 103 due to changes in ambient temperature, so that the positions of dots of an electrostatic latent image formed on the photosensitive member 105 deviate slightly, thus leading to distortion of the image, color shift, color irregularities, and so forth.

Methods of solving the above-described problem have been proposed, which include a method of driving the laser beam at a periodically varying frequency according to the characteristics of the f-θ lens, and a method of detecting a position on the photosensitive member at which the main scanning is completed, and uniformly modulating the laser driving frequency according to the deviation of the scanning completion timing from a desired timing.

However, although according to the above-described methods, values of the main scanning speed at positions on the main scan line can be averaged to obtain a desired main scanning speed, the main scanning speed cannot be arbitrarily varied for each position on the main scan line, and therefore, the dots of the electrostatic latent image cannot be formed at appropriate positions in terms of units of pixels.

Moreover, there has been employed a technique of modulating the frequency of an image write clock so that a printing position is electrically corrected. For example, there are a method of varying the frequency uniformly over a single scanning section, and a method of dividing a single scanning section into a plurality of divided sections, and analogically varying the image write clock frequency for each of the divided sections (for example, Japanese Laid-Open Patent Publication (Kokai) No. H02-282763.)

However, in these methods that modulate or vary the laser driving frequency, the frequency is also modulated from a main scanning starting position to an image write position, and therefore the image write position may shift.

SUMMARY OF THE INVENTION

It is an object of the present invention to provide an image forming apparatus and an image forming method that are capable of scanning at a proper speed at all positions on a main scan line without being affected by variations in the characteristics of the f-θ lens, variations in the laser beam wavelength, irregularities in the rotational speed of the polygon mirror and fluctuations in the characteristics of the f-θ lens due to changes in ambient temperature.

To attain the above object, in a first aspect of the present invention, there is provided an image forming apparatus comprising an image carrier, an emitting device that emits a laser beam for forming a latent image on the image carrier, a setting device that sets a modulation coefficient for each of a plurality of segments obtained by dividing a main scan line on the image carrier scanned by the emitted laser beam, an image clock generating device that generates an image clock signal for controlling emission by the emitting device for each of the segments, based on the modulation coefficient set by the setting device, a starting end detecting device that detects a starting end of the main scan line, a terminating end detecting device that detects a terminating end of the main scan line, a phase difference detecting device that detects a difference in phase between timing of detection of the terminating end by the terminating end detecting device and timing of generation of a last image clock signal for a last segment by the image clock generating device, and a correction device that corrects the modulation coefficient based on the phase difference detected by the phase difference detecting device.

Preferably, the image clock generating device sequentially generates the image clock signal for each of the segments, the image clock signal having a period calculated by sequentially adding to and subtracting from an initial period thereof a period value based on the modulation coefficient set by the setting device and a period of a reference clock signal according to progression of scanning of the segments.

Preferably, the correction device corrects the modulation coefficient for each of the segments excluding at least segments of the segments corresponding to a time period from timing of detection of the starting end by the starting end detecting device to timing of generation of image clock signals for a predetermined number of pixels by the image clock generating device, based on the phase difference detected by the phase difference detecting device.

According to the construction described above, the occurrence of image distortion, color shift, color irregularities, and so forth can be prevented and shifting of the image write position can be prevented.

Preferably, the correction device further corrects the modulation coefficient for each of the segments excluding at least segments of the segments corresponding to a time period from the timing of detection of the terminating end by the terminating end detecting device to timing of generation of image clock signals for a predetermined number of pixels by the image clock generating device, based on the phase difference detected by the phase difference detecting device.

Preferably, the correction device corrects the modulation coefficient so as to minimize the phase difference detected by the phase difference detecting device.

Preferably, the phase difference detecting device detects, as the phase difference, a ratio of a count value of the reference clock signal obtained from the timing of detection of the starting end by the starting end detecting device to the timing of detection of the terminating end by the terminating end detecting device, to a count value of the reference clock signal from the timing of detection of the starting end to the timing of generation of the last image clock signal for the last segment by the image clock generating device.

Preferably, the phase difference detecting device detects as the phase difference, a ratio of a count value of the reference clock signal obtained from timing of arrival of a segment next to the segments corresponding to the time period from the timing of detection of the starting end by the starting end detecting device to the timing of generation of the image clock signals for the predetermined number of pixels by the image clock generating device to the timing of detection of the terminating end by the terminating end detecting device, to a count value count value of the reference clock signal obtained from the timing of arrival of the next segment to the timing of generation of the last image clock signal for the last segment by the image clock generating device.

Preferably, the phase difference detecting device detects the phase difference at each scan of the main scan line, and the correction device corrects the modulation coefficient using a value of the phase difference detected when scanning an immediately preceding main scan line.

More preferably, when scanning a first main scan line for an image, the correction device corrects the modulation coefficient using a value of the phase difference detected when scanning a last main scan line for an immediately preceding image.

Preferably, the phase difference detecting device detects the phase difference at intervals of a predetermined number of main scan lines less than a total number of main scan lines for a page of images, and the correction device corrects the modulation coefficient using an immediately preceding detected value of the phase difference until a next value of the phase difference is detected.

More preferably, when scanning a first main scan line for an image, the correction device corrects the modulation coefficient using a value of the phase difference detected when scanning a last main scan line for an immediately preceding image.

Preferably, the phase difference detecting device detects the phase difference when scanning a first main scan line for each image each time a page of images is formed, and the correction device corrects the modulation coefficient using the detected phase difference when scanning at least second and succeeding main scan lines for the image.

More preferably, when scanning a first main scan line for an image, the correction device corrects the modulation coefficient using a value of the phase difference detected when scanning a last main scan line for an immediately preceding image.

Preferably, the phase difference detecting device detects the phase difference when scanning first main scan lines for images at intervals of a predetermined number of images, and the correction device corrects the modulation coefficient using an immediately preceding detected value of the phase difference during image formation until a next value of the phase difference is detected.

Preferably, when scanning a first main scan line for an image for which a next value of the phase difference is to be detected, the correction device corrects the modulation coefficient by continuing to using a value of the phase difference used heretofore.

Preferably, when a main scan line for an image is added as a first main scan line in an ineffective image region in forming a first page of images, the correction device detects the phase difference when scanning the added main scan line, and corrects the modulation coefficient for a first main scan line in an effective image region based on the detected phase difference.

Preferably, the image forming apparatus has a color image forming function, and comprises a plurality of optical scanner units.

To attain the above object, in a second aspect of the present invention, there is provided an image forming method comprising an emitting step of emitting a laser beam for forming a latent image on a image carrier, a setting step of setting a modulation coefficient for each of a plurality of segments obtained by dividing a main scan line on the image carrier scanned by the emitted laser beam, an image clock generating step of generating an image clock for controlling emission in the emitting step for each of the segments, based on the modulation coefficient set in the setting step, a starting end detecting step of detecting a starting end of the main scan line, a terminating end detecting step of detecting a terminating end of the main scan line, a phase difference detecting step of detecting a difference in phase between timing of detection of the terminating end in the terminating end detecting step and timing of generation of a last image clock signal for a last segment in the image clock generating step, and a correcting step of correcting the modulation coefficient based on the phase difference detected in the phase difference detecting step.

Preferably, the image clock generating step sequentially generates the image clock signal for each of the segments, the image clock signal having a period calculated by sequentially adding to and subtracting from an initial period thereof a period value based on the modulation coefficient set by the setting device and a period of a reference clock signal according to progression of scanning of the segments.

Preferably, the correction step corrects the modulation coefficient for each of the segments excluding at least segments of the segments corresponding to a time period from timing of detection of the starting end in the starting end detecting step to timing of generation of image clock signals for a predetermined number of pixels in the image clock generating step, based on the phase difference detected in the phase difference detecting step.

The above and other objects, features and advantages of the invention will become more apparent from the following detailed description taken in conjunction with the accompanying drawings.

DETAILED DESCRIPTION OF THE PREFERRED EMBODIMENTS

Figure 1:
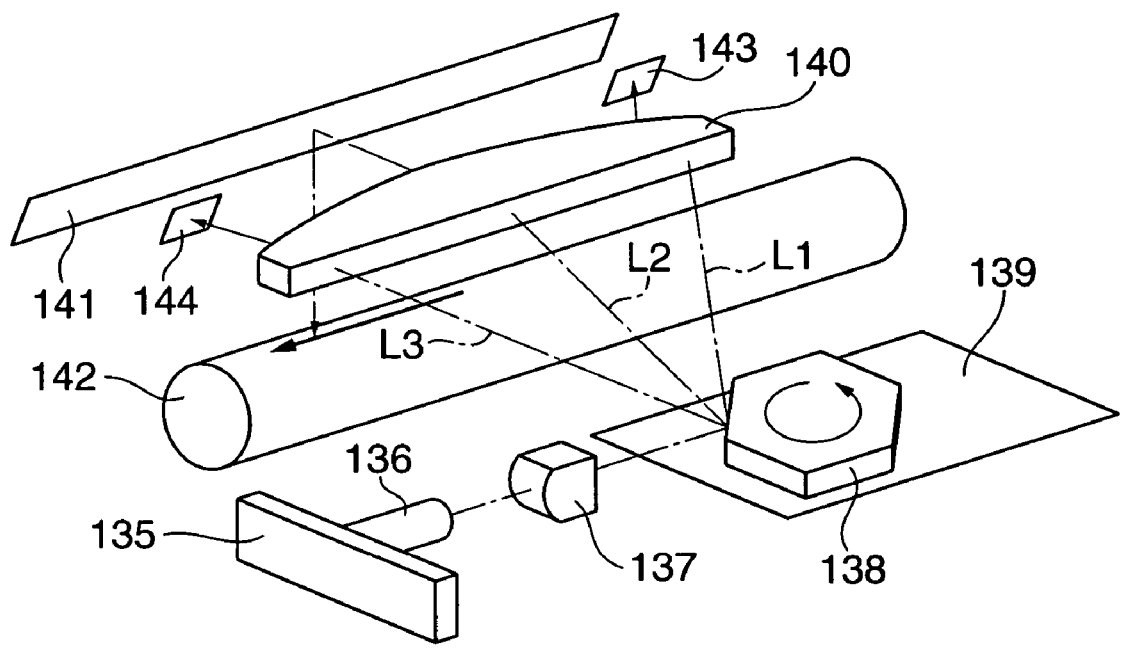
FIG. 1 is an exploded perspective view schematically showing the construction of an optical scanner unit of an image forming apparatus according to an embodiment of the present invention.

The present invention will now be described in detail below with reference to the accompanying drawings showing a preferred embodiment thereof. In the drawings, like elements and parts are designated by like reference numerals throughout the views and duplicate description thereof is omitted.

FIG. 1 is an exploded perspective view schematically showing the construction of an optical scanner unit of an image forming apparatus according to an embodiment of the present invention.

The optical scanner unit includes a laser driving circuit 135, and a laser unit 136. The laser unit (hereinafter abbreviated as the "laser") 136 includes a semiconductor laser generator, and a collimator lens, neither of which is shown. The laser driving circuit 135 drivingly controls the laser 136 so as to emit a laser beam based on an image clock signal of a frequency determined by the resolution of image data based on which images are to be formed. It should be noted that the laser driving circuit 135 has an image clock signal generator that generates the above-mentioned image clock signal.

The laser beam emitted from the laser 136 is converted into a parallel beam by a cylindrical lens 137, which is incident on a polygon mirror 138. The polygon mirror 138 is rotated at a constant angular velocity by a scanner motor unit 139, and the laser beam incident on the polygon mirror 138 is deflected by the rotating polygon mirror 138.

The deflected laser beam is further deflected by an f-θ lens 140 so as to move at a constant speed in a direction perpendicular to the direction of rotation of a photosensitive drum 142 (that is, the main scanning direction), and is reflected by a reflecting mirror 141 to be irradiated onto the photosensitive drum 142 so that an electrostatic latent image is formed on the photosensitive drum 142. The electrostatic latent image is developed into a toner image, transferred to a recording sheet, and fixed by a developing device, a transfer device and a fixing device, respectively, none of which is shown.

In an initial stage in which the laser beam starts to be irradiated onto the photosensitive drum 142, the laser beam is received by a starting end beam sensor 143 (laser beam L1 in FIG. 1). The starting end beam sensor 143 generates a reference signal (a starting end BD (Beam Detector) signal 34, described later) for image write timing at each main scan line. An effective image region is obtained on the photosensitive drum 142 when a predetermined number of clocks of the image clock signal corresponding to a predetermined number of pixels as a starting end-related clock signal have been generated after the laser beam was first detected by the starting end beam sensor 143 for each main scan line. Within the effective image region, a laser beam L2 modulated based on the image data is irradiated onto the photosensitive drum 142 to carry out image writing.

After the predetermined number of clocks of the image clock signal corresponding to the effective image region has been outputted, the laser beam is sensed by a terminating end beam sensor 144 as a laser beam L3 either during or after output of a predetermined number of clocks of the image clock signal as a terminating end-related clock signal. The terminating end beam sensor 144 generates a terminating end BD (Beam Detector) signal 37, described later. The terminating end BD signal 37, together with the starting end BD signal 34, is used to calculate a phase correction coefficient 38(m), described later.

Figure 2:
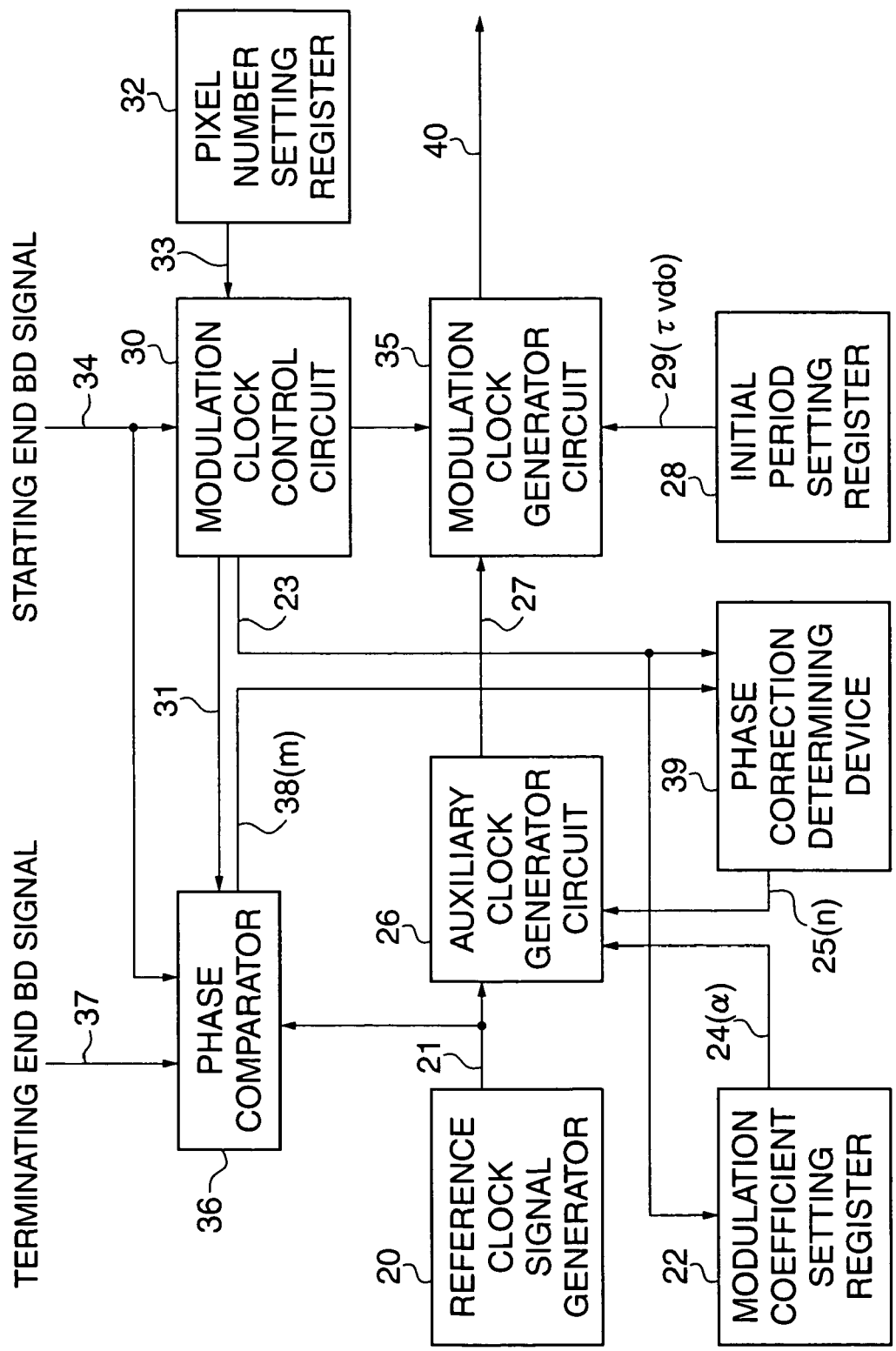
FIG. 2 is a block diagram showing the construction of an image clock generator in the optical scanner unit.

FIG. 2 is a block diagram showing the construction of the image clock generator in the laser driving circuit 135. The image clock generator generates the image clock signal for ON/OFF control of the laser beam (image beam) emitted from the laser 136. In the present embodiment, by outputting a reference clock signal after modulating the frequency thereof, the image clock generator generates an image clock signal that enables scanning at a proper speed at all positions on the main scan line.

In FIG. 2, a reference clock signal generator 20 generates the reference clock signal 21 of a predetermined frequency set in advance according to image formation speed, image data resolution and the like, and outputs the reference clock signal 21 to an auxiliary clock generator circuit 26 and a phase comparator 36.

A modulation coefficient setting register 22 stores modulation coefficients 24 (α1, α2, ...) for modulating the period of the reference clock signal 21, in the form of a table for each segment, described later. Each time a segment transition signal 23, described later, is input, each of the modulation coefficients 24 (α1, α2, ...) is output to the auxiliary clock generator circuit 26.

In addition to the reference clock signal 21 and the modulation coefficients 24 described above, a correction coefficient 25, described later, is input to the auxiliary clock generator circuit 26. Based on the input signal and coefficients, the auxiliary clock generator circuit 26 generates an auxiliary clock signal 27 and delivers the auxiliary clock signal 27 to a modulation clock generator circuit 35. For example, if the period of the reference clock signal 21 is designated by τref, the modulation coefficient 24, α and the correction coefficient 25, n, then the period Δτ of the auxiliary clock signal 27 can be expressed as follows:

$$\Delta\tau = \alpha \cdot n \cdot \tau_{ref} \quad (1)$$

Here, the modulation coefficient 24(α) is set such that the period Δτ of the auxiliary clock signal 27 is significantly shorter than the period of the image clock signal 40 output from the image clock generator (specifically, the modulation clock generator circuit 35).

An initial period setting register 28 sets an initial value 29 of the period of the image clock signal 40 output from the image clock generator.

A pixel number setting register 32 has set therein a pixel number set value 33, that is, a number of pixels per segment when a single main scan line is divided into segments in units of a number of pixels, and the pixel number set value 33 is acquired by a modulation clock control circuit 30. In the present embodiment, the number of pixels per segment is the same and all the segments are of the same size. However, alternatively, the number of pixels may be set to different numbers between the segments, and the segments may be of different sizes as well.

The modulation clock control circuit 30 divides the main scan line into a plurality of segments based on the pixel number set value 33 set in the pixel number setting register 32, and controls the modulation clock generator circuit 35 such that the period of the image clock signal 40 output from the modulation clock generator circuit 35 is constant between the segments.

Moreover, the modulation clock control circuit 30 outputs the segment transition signal 23 to the modulation coefficient setting register 22 and a phase correction determining device 39 each time a number of clocks of the image clock signal 40 corresponding to a number of pixels per segment have been output from the modulation clock generator circuit 35. Further, the modulation clock control circuit 30 outputs a last segment end signal 31 to the phase comparator 36 when a clock of the image clock signal 40 corresponding to the last pixel of the last segment is output from the modulation clock generator circuit 35.

It should be noted that the starting end BD signal 34 output from the starting end beam sensor 143 is input to the modulation clock control circuit 30 and the phase comparator 36, and the terminating end BD signal 37 output from the terminating end beam sensor 144 is input to the phase comparator 36.

When the starting end BD signal 34 is input to the modulation clock control circuit 30, the modulation clock control circuit 30 controls the modulation clock generator circuit 35 to generate and output the image clock signal 40 having an initial period 29 ($\tau vdo$) at the first segment (segment 0). The modulation clock control circuit 30 controls the modulation clock generator circuit 35 to generate and output, at the next segment (segment 1), the image clock signal 40 (modulation clock signal $\Delta T1$) having a period expressed by Equation (2) below, based on the auxiliary clock signal 27 and the initial period 29 ($\tau vdo$):

$$\Delta T1 = \tau vdo + \alpha 1 \cdot n \cdot \tau ref \quad (2)$$

Similarly, the modulation clock control circuit 30 controls the modulation clock generator circuit 35 to generate and output, at the next segment (segment 2), the image clock signal 40 (modulation clock signal $\Delta T2$) having a period expressed by Equation (3) below, based on the auxiliary clock signal 27 and the initial period 29 ($\tau vdo$):

$$\Delta T2 = \tau vdo + \alpha 1 \cdot n \cdot \tau ref + \alpha 2 \cdot n \cdot \tau ref \quad (3)$$

Thereafter, similarly, at the respective following segments, the modulation clock signals $\Delta T$ obtained by sequentially adding to and subtracting from the initial period 29 ($\tau vdo$) the initial clock signal 27 period $\Delta \tau$ ($\alpha \cdot n \cdot \tau ref$) are generated and output as the image clock signal 40. In other words, image clock signals having respective different periods are generated and output as the image clock signal 40 within a single main scan line.

The phase comparator 36 starts counting clocks of the reference clock signal 21 when the starting end BD signal 34 is input, and calculates the phase correction coefficient 38($m$) using Equation (4) below, based on a count value (cnt1) up to input of the terminating end BD signal 37 and a count value (cnt2) up to input of the last segment end signal 31, and outputs the calculated phase correction coefficient 38($m$) to the phase correction determining device 39.

$$m = cnt1/cnt2 \quad (4)$$

The phase correction determining device 39 counts the number of times the segment transition signal 23 is generated input from the modulation clock control circuit 30 and determines whether or not the count value is equal to a predetermined segment number, to thereby determine whether or not the image clock signal 40 currently being output from the modulation clock generator circuit 35 corresponds to a segment corresponding to the starting end-related clock signal. If the image clock signal 40 does not correspond to the segment corresponding to the starting end-related clock signal, then the input phase correction coefficient 38($m$) is output as it is to the auxiliary clock generator circuit 26 as the correction coefficient 25($n$). By contrast, if the image clock signal 40 corresponds to the segment corresponding to the starting end-related clock signal, then "1" is output as the correction coefficient 25($n$) to the auxiliary clock generator circuit 26, so that phase correction based on the correction coefficient 25($n$) is not substantially carried out.

Figure 3:
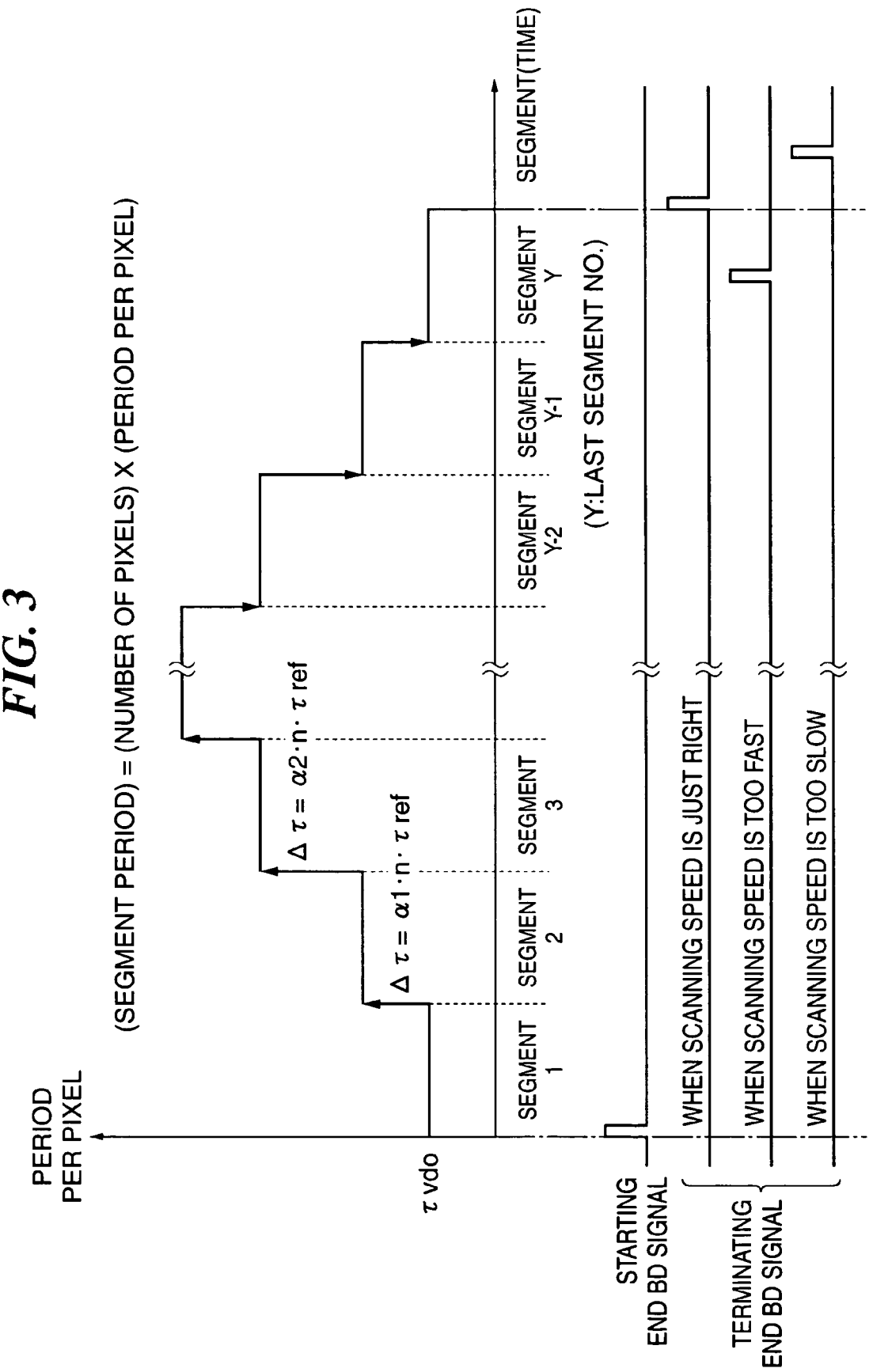
FIG. 3 is a timing chart showing periods in segments of an image clock signal generated by the image clock generator.
Figure 4:
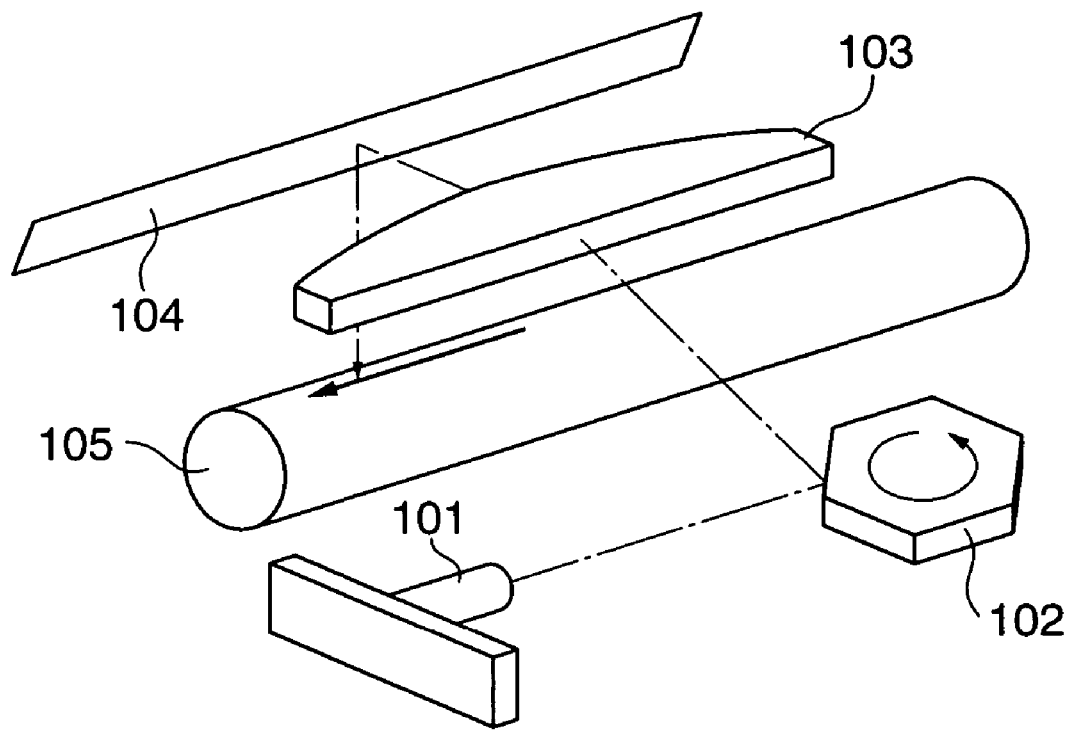
FIG. 4 is an exploded perspective view schematically showing the construction of a conventional optical scanner unit.

The relationship between the above-described segments and the periods of the image clock signal corresponding to the segments, as well as the relationship between the segments and the starting end BD signal and the terminating end BD signal, are shown in FIG. 3.

Next, the operation and effects of the image clock generator constructed as described above will be described. In the following description, the number of pixels per segment is designated by X, the number of segments, Y-1, the number of starting end-related clocks, X (that is, the segment 0 is the starting end-related clock segment), and the number of terminating end-related clocks, X (that is, the segment Y is the terminating end-related clock segment).

The modulation coefficient setting register 22 has set therein modulation coefficients 24($\alpha 1 - \alpha y$) for segment 1 to segment Y, determined according to the f-$\theta$ lens characteristics and laser wavelength. The image clock generator generates the image clock signal of which the frequency is modulated using the modulation coefficients 24($\alpha 1 - \alpha y$), and therefore the image forming apparatus, when just purchased, can carry out main scanning at an accurate speed at all positions on the main scan line when scanning the photosensitive drum 142 with the laser beam.

However, with the use of the image forming apparatus, there can occur irregularities in the rotational speed of the polygon mirror 138 and fluctuations in the characteristics of the f-$\theta$ lens 103 due to ambient temperature changes, which can cause the main scanning speed to fluctuate. To deal with this, the image clock generator compares the phases of the terminating end BD signal 37 and the last segment end signal 31 at every main scan, and repeats operations (1) to (3) below to further correct the modulation coefficient a based on the phase difference.

That is:

(1) The phase comparator 36 starts counting clocks of the reference clock signal 21 when the starting end BD signal 34 is input.

(2) During output of the image clock signal 40, image clock signals of frequencies that are different (or are identical) between segments are output as the image clock signal 40 from the image clock generator in accordance with the modulation coefficients ($\alpha 1$ to $\alpha y$) set in advance for the respective segments and the correction coefficient 25($n$) common to all the segments calculated during the immediately preceding main scan. However, in the segment 0, at which the starting end-related clock signal is output, phase correction control is not substantially carried out because the correction coefficient 25($n$) is set to 1.

(3) The phase correction coefficient 38($m$) ($m$=cnt1/cnt2) is calculated from the count value (cnt1) of the reference clock signal 21 obtained from input of the starting end BD signal 34 to input of the terminating end BD signal 37 and the count value (cnt2) of the reference clock signal 21 obtained from input of the starting end BD signal 34 to input of the last segment Y end signal 31 and is set as the correction coefficient 25(*n*) for use in the next main scan.

It should be noted that when there is no fluctuation in the main scanning speed, the phases of the terminating end BD signal 37 and the last segment Y end signal 31 coincide with each other, and therefore the correction coefficient 25(*n*) becomes "1" and in substantial phase correction control is not carried out. Conversely, when the phases of the terminating end BD signal 37 and the last segment Y end signal 31 do not coincide because of fluctuations in the main scanning speed, phase correction control is carried out so that the phases of the terminating end BD signal 37 and the last segment Y end signal 31 in the next main scan coincide with each other (that is, so that the phase difference between the above signals is minimized and hence the main scanning speed becomes constant).

It should be noted that phase correction for the scanning of a first main scan line for a next image is carried out using the phase correction coefficient 38(*m*) calculated during the scanning of a last main scan line for an immediately preceding image.

In the above-described way, by dividing a laser scan section (main scan line) into a plurality of segments, setting a modulation coefficient according to variations in the f-θ lens and variations in the laser beam wavelength at each segment, and modulating the reference clock signal using the set modulation coefficient, it is possible to scan all positions on the main scan line at a proper speed without being affected by variations in the characteristics of the f-θ lens and variations in the laser beam wavelength.

Moreover, by calculating the phase correction coefficient for the next scan from the difference in phase between the terminating end BD signal and the last segment end signal for every main scan, and using the calculated phase correction coefficient to further correct the modulation coefficient at each segment, it is possible to carry out a main scan at a proper speed without being affected by irregularities in the rotational speed of the polygon mirror and fluctuations in the characteristics of the f-θ lens due to ambient temperature changes and so forth.

Further, phase correction is not carried out on the segments from the starting end BD signal to the effective image region, and hence the image write position does not shift.

It should be noted that the present invention is not limited to the embodiment described above. For example, although the segment corresponding to the terminating end-related clock signal is also phase corrected in the above-described embodiment, when the number of terminating end-related clocks is large, phase correction may be limited to just an effective image region excluding a segment corresponding to the starting end-related clock signal as well as a segment corresponding to the terminating end-related clock signal.

Moreover, although in the above-described embodiment the phase comparator simply calculates the phase correction coefficient by comparing the count value of the reference clock signal obtained from the starting end BD signal to the last segment end signal and the count value of the reference clock signal obtained from the starting BD signal to the ending BD signal, it is possible to calculate the phase correction coefficient more accurately by detecting the end of the starting end-related clock signal from the segment number, and comparing a count value of the reference clock signal obtained from the next segment after the segment for which the end of the starting end-related clock signal is detected to the last segment end signal, and a count value of the reference clock signal obtained from the above next segment to the terminating end BD signal.

Moreover, although in the above-described embodiment the phase correction coefficient is calculated each time a single line is scanned and phase correction for the next line of scanning is carried out based on the calculated phase correction coefficient, alternatively, it is also possible to calculate the phase correction coefficient at intervals of a predetermined number of main scan lines (such number being less than the total number of scanning lines for a page of images), for example, calculating the phase correction coefficient for the main scan lines of odd-numbered lines only, or calculating the phase correction coefficient for only a first line, a fifth line, a tenth line, and so forth.

In such a case, until the next phase correction coefficient is calculated, phase correction is carried out using the phase correction coefficient calculated for the preceding scanning line for which the phase correction is to be calculated. It is preferable to optimize the main scanning speed even at the first main scan line for the next image by carrying out phase correction for the scanning of the first main scan line for the next image using the phase correction coefficient calculated during the scanning of the last main scan line for the immediately preceding image.

Moreover, it is also possible to calculate the phase correction coefficient each time a page of images is formed. In such a case, it is preferable to calculate the phase correction coefficient when scanning the first main scan line for each image, and to carry out phase correction for the second and succeeding lines of the image, and for the first main scan line for the next image, based on the calculated phase correction coefficient.

Moreover, it is also possible to calculate the phase correction coefficient when scanning the first main scan lines for images at intervals of a predetermined number of images, such as the first image, the third image, the fifth image . . . and so on. In such a case, during image formation until the next phase correction coefficient is calculated, phase correction is carried out based on the phase correction coefficient calculated for the preceding image for which the coefficient is to be calculated. It is preferable to carry out phase correction by continuing to use the phase correction coefficient used heretofore when scanning the first main scan line for the next image for which the next phase correction coefficient is to be calculated.

Moreover, in the above-described embodiment and the above-described variations thereof, when forming a first page of images, it is also possible to specially add a main scan line for an image as a first main scan line in an ineffective image region, calculate the phase correction coefficient when scanning the added main scan line, and carry out phase correction for the first main scan line in the effective image region based on the calculated phase correction coefficient.

Further, in an image forming apparatus having a plurality of optical scanner units such as a color image forming apparatus, it is also possible to configure such optical scanner units so as to be able to implement any of the embodiment described above and variations thereof. In such a case, for example, when forming a color image, the optical scanner units corresponding to the respective colors are caused to execute the functions according to any of the above-described embodiment and variations thereof, and when forming a black-and-white image, only the optical scanner unit corresponding to monochrome is caused to execute the functions according to any of the above-described embodiment and variations thereof.

It goes without saying that the object of the present invention may also be accomplished by supplying a system or an apparatus with a storage medium (or a recording medium) in which a program code of software, which realizes the functions of any of the above described embodiment and variations thereof is stored, and causing a computer (or CPU or MPU) of the system or apparatus to read out and execute the program code stored in the storage medium.

In this case, the program code itself read from the storage medium realizes the functions of any of the above described embodiment and variations thereof, and hence the program code and a storage medium on which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be supplied by downloading from another computer, a database, or the like, not shown, connected to the Internet, a commercial network, a local area network, or the like.

Further, it is to be understood that the functions of any of the above described embodiment and variations thereof may be accomplished not only by executing the program code read out by a computer, but also by causing an OS (operating system) or the like which operates on the computer to perform a part or all of the actual operations based on instructions of the program code.

Further, it is to be understood that the functions of any of the above described embodiment and variations thereof may be accomplished by writing the program code read out from the storage medium into a memory provided in an expansion board inserted into a-computer or a memory provided in an expansion unit connected to the computer and then causing a CPU or the like provided in the expansion board or the expansion unit to perform a part or all of the actual operations based on instructions of the program code.

Further, the above program has only to realize the functions of any of the above described embodiment and variations thereof on a computer, and the form of the program may be an object code, a program executed by an interpreter, or script data supplied to an OS.

What is claimed is:

1. An image forming apparatus comprising:
an image carrier;
an emitting device that emits a laser beam for forming a latent image on said image carrier;
a setting device that sets a modulation coefficient for each of a plurality of segments obtained by dividing a main scan line on said image carrier scanned by the emitted laser beam;
an image clock generating device that generates an image clock signal for controlling emission by said emitting device for each of the segments, based on the modulation coefficient of the corresponding segment set by said setting device;
a starting end detecting device that detects a starting end of the main scan line;
a terminating end detecting device that detects a terminating end of the main scan line;
a phase difference detecting device that detects a difference in phase between timing of detection of the terminating end by said terminating end detecting device and timing of generation of a last image clock signal for a last segment by said image clock generating device; and
a correction device that corrects the modulation coefficient for at least some of the segments based on the phase difference detected by said phase difference detecting device.

2. An image forming apparatus as claimed in claim 1, wherein said image clock generating device sequentially generates the image clock signal for each of the segments, the image clock signal having a period calculated by sequentially adding to and subtracting from an initial period thereof a period value based on the modulation coefficient of the corresponding segment set by said setting device and a period of a reference clock signal according to progression of scanning of the segments.

3. An image forming apparatus as claimed in claim 1, wherein said correction device corrects the modulation coefficient for each of the segments excluding at least segments among the segments corresponding to a time period from timing of detection of the starting end by said starting end detecting device to timing of generation of image clock signals for a predetermined number of pixels by said image clock generating device, based on the phase difference detected by said phase difference detecting device.

4. An image forming apparatus as claimed in claim 1, wherein said correction device further corrects the modulation coefficient for each of the segments excluding at least segments of the segments corresponding to a time period from the timing of detection of the terminating end by said terminating end detecting device to timing of generation of image clock signals for a predetermined number of pixels by said image clock generating device, based on the phase difference detected by said phase difference detecting device.

5. An image forming apparatus as claimed in claim 1, wherein said correction device corrects the modulation coefficient for each of the segments so as to minimize the phase difference detected by said phase difference detecting device.

6. An image forming apparatus as claimed in claim 1, wherein said phase difference detecting device detects, as the phase difference, a ratio of a count value of the reference clock signal obtained from the timing of detection of the starting end by said starting end detecting device to the timing of detection of the terminating end by said terminating end detecting device, to a count value of the reference clock signal from the timing of detection of the starting end to the timing of generation of the last image clock signal for the last segment by said image clock generating device.

7. An image forming apparatus as claimed in claim 1, wherein said phase difference detecting device detects as the phase difference, a ratio of a count value of the reference clock signal obtained from timing of arrival of a segment next to the segments corresponding to the time period from the timing of detection of the starting end by said starting end detecting device to the timing of generation of the image clock signals for the predetermined number of pixels by said image clock generating device to the timing of detection of the terminating end by said terminating end detecting device, to a count value count value of the reference clock signal obtained from the timing of arrival of the next segment to the timing of generation of the last image clock signal for the last segment by said image clock generating device.

8. An image forming apparatus as claimed in claim 1, wherein said phase difference detecting device detects the phase difference at each scan of the main scan line, and said correction device corrects the modulation coefficient for each of the segments using a value of the phase difference detected when scanning an immediately preceding main scan line.

9. An image forming apparatus as claimed in claim 8, wherein, when scanning a first main scan line for an image, said correction device corrects the modulation coefficient for each of the segments using a value of the phase difference detected when scanning a last main scan line for an immediately preceding image.

10. An image forming apparatus as claimed in claim 1, wherein said phase difference detecting device detects the phase difference at intervals of a predetermined number of main scan lines less than a total number of main scan lines for a page of images, and said correction device corrects the modulation coefficient for each of the segments using an immediately preceding detected value of the phase difference until a next value of the phase difference is detected.

11. An image forming apparatus as claimed in claim 10, wherein, when scanning a first main scan line for an image, said correction device corrects the modulation coefficient for each of the segments using a value of the phase difference detected when scanning a last main scan line for an immediately preceding image.

12. An image forming apparatus as claimed in claim 1, wherein said phase difference detecting device detects the phase difference when scanning a first main scan line for each image each time a page of images is formed, and said correction device corrects the modulation coefficient for each of the segments using the detected phase difference when scanning at least second and succeeding main scan lines for the image.

13. An image forming apparatus as claimed in claim 12, wherein, when scanning a first main scan line for an image, said correction device corrects the modulation coefficient for each of the segments using a value of the phase difference detected when scanning a last main scan line for an immediately preceding image.

14. An image forming apparatus as claimed in claim 1, wherein said phase difference detecting device detects the phase difference when scanning first main scan lines for images at intervals of a predetermined number of images, and said correction device corrects the modulation coefficient for each of the segments using an immediately preceding detected value of the phase difference during image formation until a next value of the phase difference is detected.

15. An image forming apparatus as claimed in claim 14, wherein, when scanning a first main scan line for an image for which a next value of the phase difference is to be detected, said correction device corrects the modulation coefficient for each of the segments by continuing to using a value of the phase difference used heretofore.

16. An image forming apparatus as claimed in claim 1, wherein when a main scan line for an image is added as a first main scan line in an ineffective image region in forming a first page of images, said correction device detects the phase difference when scanning the added main scan line, and corrects the modulation coefficient for each of the segments for a first main scan line in an effective image region based on the detected phase difference.

17. An image forming apparatus as claimed in claim 1, wherein the image forming apparatus has a color image forming function, and comprises a plurality of optical scanner units.

18. An image forming method comprising:
an emitting step of emitting a laser beam for forming a latent image on an image carrier;
a setting step of setting a modulation coefficient for each of a plurality of segments obtained by dividing a main scan line on said image carrier scanned by the emitted laser beam;
an image clock generating step of generating an image clock signal for controlling emission in said emitting step for each of the segments, based on the modulation coefficient of the corresponding segment set in said setting step;
a starting end detecting step of detecting a starting end of the main scan line;
a terminating end detecting step of detecting a terminating end of the main scan line;
a phase difference detecting step of detecting a difference in phase between timing of detection of the terminating end in said terminating end detecting step and timing of generation of a last image clock signal for a last segment in said image clock generating step; and
a correcting step of correcting the modulation coefficient for some of the segments based on the phase difference detected in said phase difference detecting step.

19. An image forming method as claimed in claim 18, wherein said image clock generating step sequentially generates the image clock signal for each of the segments, the image clock signal having a period calculated by sequentially adding to and subtracting from an initial period thereof a period value based on the modulation coefficient of the corresponding segment set by said setting device and a period of a reference clock signal according to progression of scanning of the segments.

20. An image forming method as claimed in claim 19, wherein said correction step corrects the modulation coefficient for each of the segments excluding at least segments of the segments corresponding to a time period from timing of detection of the starting end in said starting end detecting step to timing of generation of image clock signals for a predetermined number of pixels in said image clock generating step, based on the phase difference detected in said phase difference detecting step.

* * * * *